Figure 1:
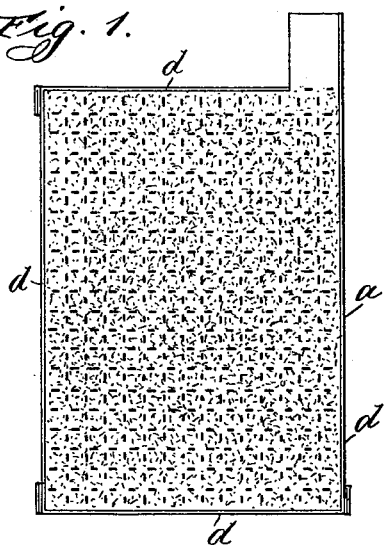

No. 625,938. Patented May 30, 1899.
H. G. OSBURN.
ACCUMULATOR PLATE.
(Application filed July 27, 1898.)

(No Model.)

Witnesses:
V. J. Jacker.
M. A. Rochford.

Inventor:
Harry G. Osburn
By Ludington & Jones.
Attorneys.

UNITED STATES PATENT OFFICE.

HARRY G. OSBURN, OF CHICAGO, ILLINOIS.

ACCUMULATOR-PLATE.

SPECIFICATION forming part of Letters Patent No. 625,938, dated May 30, 1899.

Application filed July 27, 1898. Serial No. 687,004. (No model.)

*To all whom it may concern:*

Be it known that I, HARRY G. OSBURN, a citizen of the United States, residing at Chicago, in the county of Cook and State of Illinois, have invented a certain new and useful Improvement in Accumulator-Plates, of which the following is a full, clear, concise, and exact description, reference being had to the accompanying drawings, forming a part of this specification.

My invention relates to an accumulator plate or grid, my object being to provide a plate or support for holding the active material of an accumulator or storage battery which will effectively secure the active material in position, will be of minimum weight, and will present a maximum area of active material in contact with the surface of the plate, thereby producing a high rate of discharge for a given weight of plate.

Storage-battery plates have heretofore been formed most extensively from cast-lead, the lead being molded to form interstices or pockets in the plate for the reception of the active material. The most approved form of cast plate has been that in which a series of transverse openings or interstices is formed through the plate; but due to the fact that the plate is cast the intersecting bars or ribs must be formed with tapering walls, due to the draft necessary to permit the withdrawal of the pattern from the mold in forming the plate. In order that the plate may be symmetrical, the walls of these ribs or bars usually taper from the middle outward in both directions. Difficulty has been experienced with these plates, due to the loosening of the active material in the pockets or interstices by the expansion and contraction of the active material and the plate. Since the active material rests in contact with the plate along tapering or oblique walls, the expansion of the active material tends to wedge the same out of the pockets, and this either results in the falling out of the pellets of active material entirely or the loosening of the same within the pockets to thereby affect the intimacy of contact between the active material and the plate and reduce the effectiveness of the cell and the rate of discharge, which depends upon the area of active material in intimate contact with the surface of the plate.

It has been proposed to employ rolled sheet-lead for the formation of the battery-plate, and this presents many advantages over cast-lead, the rolled lead being more closely grained and more homogeneous, and on this account possessing a longer life than cast-lead. Furthermore, the rolled lead permits the formation of a much lighter plate than cast-lead. The problem in the employment of rolled or sheet lead has been to produce a construction which will effectively and securely maintain the active material in position, while at the same time bringing the largest possible area of active material in contact with the surface of the plate. In accordance with the present invention I am enabled to bring practically all of the surface of the plate, on both sides thereof, into direct and intimate contact with the active material and am enabled to so form the pockets or interstices that all of the expansion and contraction of the active material will take place within the plane of the plate and perpendicular to the walls of the pockets, whereby there is no tendency for the active material to work loose or fall out of the pockets.

In forming the plate I provide a thin sheet of rolled lead and form incisions or openings therein in such positions that sections of the plate may be bent or twisted into transverse positions, preferably perpendicular to the plane of the plate, to form the side walls of the pockets for the reception of the active material. The width of the sections thus severed and bent into transverse positions will determine the thickness of the completed plate, since the depth of the pockets or interstices will be equal to the width of the bent or twisted sections. I preferably form the pockets of rectangular shape, the sections of the plate being bent into transverse positions to form the four sides of the rectangular pocket. I preferably form the sections which are to be bent into transverse positions with narrow necks, connecting the same with the remainder of the plate, whereby the bending of the sections is facilitated, although I do not consider the provision of these narrow necks essential, and they may be omitted in some constructions. I preferably form the sections symmetrical about the medial axis about which the same are twisted or bent, whereby the resulting plate or grid will be symmetrical about a medial plane passing through the plate.

I have illustrated my invention in the accompanying drawings, in which—

Figure 2:
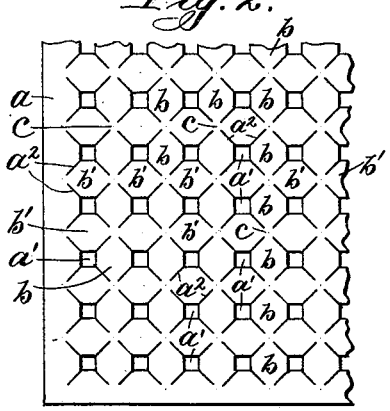
Figure 3:
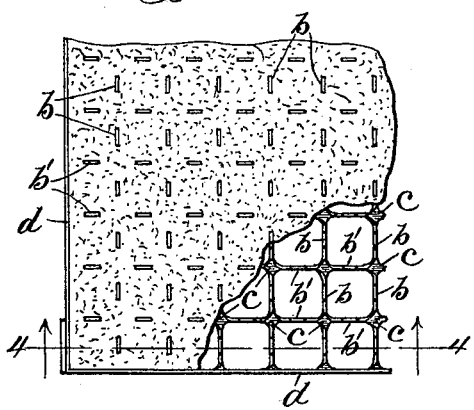
Figure 5:
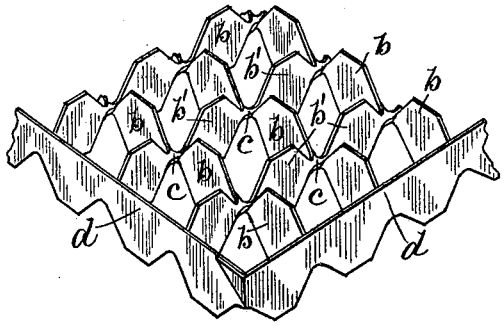
Figure 4:

Figure 1 is a view of the completed plate. Fig. 2 is a partial view of the blank or sheet from which the plate is formed. Fig. 3 is a face view of the plate, showing the active material partially removed. Fig. 4 is a sectional view on line 4 4, Fig. 3. Fig. 5 is a perspective view of a portion of the plate.

Like letters refer to like parts in the several figures.

The blank or sheet $a$ from which the plate or support is formed is stamped by means of a die or otherwise to provide a series of openings $a'$ $a'$, preferably square and with incisions $a^2$ $a^2$ extending from the corners thereof to thus form a series of sections $b$ $b$ extending in rows in one direction and a series of sections $b'$ $b'$ extending in rows in a direction at right angles. The sections $b$ $b'$ are twisted or bent into a transverse position, so as to extend perpendicular to the plane of the plate, the metal at the necks or connecting portions $c$ $c$ accommodating the twisting of the sections. Thus the twisted sections $b$ $b$ and $b'$ $b'$ form the side walls of a series of pockets or interstices extending transversely through the plate. The bounding-rims $d$ $d$ are bent into transverse positions to form the side walls of the pockets, which are formed at the edges of the plate. The depth of the pockets, and consequently the thickness of the completed plate, will be determined by the width of the sections $b$ $b'$, which are severed and bent into the transverse positions, and the plate may thus be made of any desired thickness by forming the sections of the desired width.

While I preferably form the incisions $a^2$ $a^2$ to accommodate the bending of the sections into transverse positions, the incisions may be omitted and the yielding and tearing of the metal depended upon for the accommodation of the twisting of the sections into transverse position. Furthermore, while I preferably form the pockets with four sides they may be otherwise shaped, and while the particular shape of the section illustrated gives the most satisfactory results and permits the utilization of the greatest possible amount of metal of the plate the section may, when desired, take other form, and the openings and incisions of the blank or sheet may be otherwise disposed.

It will be observed that by bending the sections into perpendicular positions the side walls of the pockets will be perpendicular to the plane of the plate, and as the expansion and contraction of the active material will thus be in the plane of the plate and perpendicular to the side walls there will be no tendency for the pellets of active material in the pockets to work loose; and, furthermore, since the active material and the material of the plate expand and contract in the same directions and in practically equal degree the active material will be constantly maintained in intimate contact with the surface of the plate. By the employment of the plate of my invention practically all of the surface of the blank or sheet from which the plate is formed, on both sides thereof, is brought directly into contact with the active material, since the opposite faces of the sections form the side walls of the adjacent pockets; and, furthermore, the greater portion of the edges of the section are brought into contact with the active material and the only portions of the plate which do not rest in contact with the active material are the side edges of the sections. Thus a plate presenting the greatest possible amount of surface to the active material is produced, resulting in a maximum rate of discharge for given weight.

Having described my invention, what I claim as new, and desire to secure by Letters Patent, is—

1. An accumulator-plate formed of a sheet of metal and having a series of sections thereof severed except at opposite ends and bent or twisted into position perpendicular to the plane of the plate to form the perpendicular side walls of adjacent transverse pockets, whereby the falling out of the pellets of active material is effectively prevented, substantially as described.

2. An accumulator-plate formed of a sheet of metal and having a series of sections thereof partially severed and bent or twisted about a medial axis into transverse positions to form the symmetrical side walls of transverse pockets, substantially as described.

3. An accumulator-plate, formed of a sheet of metal and having a series of sections thereof severed except at opposite ends and bent or twisted into transverse positions to form the side walls of transverse pockets for the reception of active material, substantially as described.

4. An accumulator-plate formed of a sheet of metal and having a series of sections joined to the body of the plate by narrow necks at opposite ends of the sections and bent or twisted into transverse positions to form the side walls of transverse pockets, substantially as described.

5. An accumulator-plate formed of a sheet of metal having pieces thereof removed at intervals to leave a series of openings bounded by strips of metal severed except at opposite ends, said strips being bent into transverse positions to form the side walls of adjacent pockets, substantially as described.

6. An accumulator-plate formed of a sheet of metal having a series of openings therein and incisions extending therefrom, and having the sections or strips of metal between the same bent or twisted into transverse positions, substantially as described.

7. An accumulator-plate formed of a sheet of metal and having a series of sections thereof partially severed and bent or twisted about a medial axis into transverse positions to form the symmetrical side walls of transverse pockets, and active material in said pockets, substantially as described.

8. An accumulator-plate formed of a sheet of metal and having a series of sections thereof severed except at opposite ends and bent or twisted into transverse positions to form the side walls of transverse pockets, and active material in said pockets, substantially as described.

In witness whereof I have hereunto subscribed my name in the presence of two witnesses.

HARRY G. OSBURN.

Witnesses:
W. CLYDE JONES,
M. R. ROCHFORD.